United States Patent
Cai

(10) Patent No.: US 9,904,140 B2
(45) Date of Patent: Feb. 27, 2018

(54) ELECTROPHORETIC PARTICLE AND METHOD FOR MANUFACTURING THE SAME, ELECTROPHORETIC MICROSTRUCTURE AND ELECTROPHORETIC DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Peizhi Cai, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 457 days.

(21) Appl. No.: 14/345,335

(22) PCT Filed: Jun. 6, 2013

(86) PCT No.: PCT/CN2013/076888
§ 371 (c)(1),
(2) Date: Mar. 17, 2014

(87) PCT Pub. No.: WO2014/172962
PCT Pub. Date: Oct. 30, 2014

(65) Prior Publication Data
US 2016/0187754 A1 Jun. 30, 2016

(30) Foreign Application Priority Data
Apr. 22, 2013 (CN) .......................... 2013 1 0139384

(51) Int. Cl.
*G02B 26/00* (2006.01)
*G02F 1/167* (2006.01)
(Continued)

(52) U.S. Cl.
CPC .......... *G02F 1/167* (2013.01); *C09K 11/7792* (2013.01); *G02F 2001/133614* (2013.01);
(Continued)

(58) Field of Classification Search
CPC ........................................ G02F 1/167
(Continued)

(56) References Cited

U.S. PATENT DOCUMENTS

| 2002/0171910 | A1 | 11/2002 | Pullen et al. |
| 2004/0150613 | A1* | 8/2004 | Li .......................... G09G 3/344 345/107 |
| 2007/0046566 | A1* | 3/2007 | Song .................... C09B 67/0063 345/30 |

FOREIGN PATENT DOCUMENTS

| CN | 102621760 A | 8/2012 |
| CN | 102746845 A | 10/2012 |
| EP | 1010036 B1 | 6/2004 |

OTHER PUBLICATIONS

International Preliminary Report on Patentability dated Oct. 27, 2015: PCT/CN2013/076888.
(Continued)

*Primary Examiner* — James Jones
(74) *Attorney, Agent, or Firm* — Ladas & Parry LLP

(57) ABSTRACT

An electrophoretic particle, a method for manufacturing the electrophoretic particle, an electrophoretic microstructure and an electrophoretic display device are disclosed. The electrophoretic particle includes an electrophoretic particle body and a layer of photoluminescence material coated on the surface of the electrophoretic particle body. A method for
(Continued)

manufacturing an electrophoretic particle includes: preparing a photoluminescence material; preparing an electrophoretic particle body; and forming a layer of photoluminescence material on the surface of the electrophoretic particle body.

10 Claims, 3 Drawing Sheets

(51) Int. Cl.
    *C09K 11/77*     (2006.01)
    *G02F 1/1335*     (2006.01)

(52) U.S. Cl.
    CPC ............... *G02F 2001/1672* (2013.01); *G02F 2001/1678* (2013.01)

(58) Field of Classification Search
    USPC .......................................... 359/296
    See application file for complete search history.

(56) References Cited

OTHER PUBLICATIONS

International Search Report dated Jan. 24, 2014; PCT/CN2013/076888.
First Chinese Office Action dated Feb. 28, 2015; Appln. No. 201310139384.0.
Written Opinion of the International Searching authority Appln. No. PCT/CN2013/076888; dated Jan. 30, 2014.
Second Chinese Office Action Appln. No. 201310139384.0; dated Aug. 17, 2015.
Third Chinese Office Action dated Dec. 22, 2015; Appln. No. 201310139384.0.

\* cited by examiner

ELECTROPHORETIC PARTICLE AND METHOD FOR MANUFACTURING THE SAME, ELECTROPHORETIC MICROSTRUCTURE AND ELECTROPHORETIC DISPLAY DEVICE

TECHNICAL FIELD

Embodiments of the present invention relates to electrophoretic particles and a method for manufacturing the same, an electrophoretic microstructure and an electrophoretic display device.

BACKGROUND

Electronic paper is getting more and more attention for its advantageous such as extremely low power consumption and suitability for human reading. Nowadays, electrophoretic electronic paper has two display types, namely microcapsule and micro-cup. The display principle of the electronic paper is that electrophoresis liquid encapsulated in the microcapsules or micro-cups comprises black electrophoretic particles negatively charged and white electrophoretic particles positively charged. As shown in FIG. 1, if an upper substrate is positively charged and a bottom substrate is negatively charged, the black electrophoretic particles 3 that are negatively charged move upwards while the white electrophoretic particles 4 that are positively charged move downwards due to the principle that same electric charges mutually repel and opposite electric charges mutually attract, thus corresponding micro-structures present black. The electrophoretic display device displays images through contrast between black and white.

Current electronic paper displaying images is achieved through black electrophoretic particles absorbing and white electrophoretic particles reflecting natural light. So, the electronic paper only works in bright environments and cannot work in a dark environment.

SUMMARY

Embodiments of the present application provide an electrophoretic particle and a method for manufacturing the same, an electrophoretic microstructure and an electrophoretic display device. The electrophoretic particle comprises an electrophoretic particle body and a layer of photoluminescene material coated on the surface of the electrophoretic particle body. Such an electrophoretic particle can facilitate display in a dark environment.

An embodiment of the present application provides an electrophoretic particle comprises an electrophoretic particle body and a layer of photoluminescene material coated on a surface of the electrophoretic particle body.

For example, a material for manufacturing the layer of photoluminescene material is a rare-earth long afterglow photoluminescene material.

For example, the photoluminescence material is an organic photoluminescence material.

For example, the electrophoretic particle carries positive charges or negative charges.

An embodiment of the present application provides an electrophoretic microstructure comprising electrophoresis liquid which contains at least one electrophoretic particle according to any embodiment of the present application.

For example, the microstructure is a micro-capsule or a micro-cup.

For example, the electrophoresis liquid contains electrophoretic particles positively charged and electrophoretic particles negatively charged, which have different colors.

An embodiment of the present application provides an electrophoretic display device which has electrophoretic microstructures according to any embodiment of the present application.

An embodiment of the present application provides a method for manufacturing an electrophoretic particle, which comprises: preparing a photoluminescence material; preparing an electrophoretic particle body; and forming a layer of photoluminescence material on the surface of the electrophoretic particle.

For example, forming a layer of photoluminescence material on the surface of the electrophoretic particle comprises: grinding the photoluminescence material and adding the electrophoretic particle body into the grinded photoluminescence material.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE SIGNS

1—upper substrate; 2—bottom substrate; 3—black electrophoretic particle with negative charges; 4—white electrophoretic particle with positive charges; 10—electrophoretic particle body; 11—photoluminescence material layer.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, technical terms or scientific terms used herein should be construed as general meanings that those skilled in the art understand. The terms "a", "an", "the" and the like used before an element are not limitative to the quantity thereof, and just denote the presence of at least one of such element. The terms "comprise", "include" and the like means that the element or the thing before the terms "comprise" or "include" contains elements or things and the like listed behind the terms "comprising" or "including", and do not exclude other elements or things. The terms "connection" or "connected" are not limited to a physical or mechanical connection or link, and may also comprise electrical connection, whatever direct or indirect. The terms "on", "below", "left", "right" and the like are only intended to denote relative positional relationship of objects, and the relative positional relationship may change correspondingly if absolute positions of the described objects change.

Figure 1:
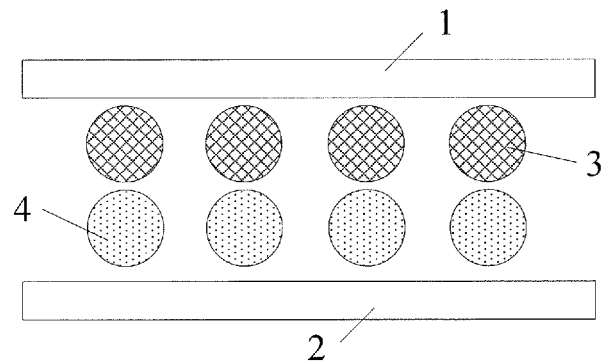
FIG. 1 is a schematic diagram of displaying principle of an existing electronic paper.
Figure 2:
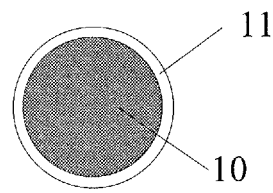
FIG. 2 is an electrophoretic particle according to an embodiment of the present application.

An embodiment of the present application provides an electrophoretic particle, which comprises an electrophoretic particle body 10 and a layer of photoluminescence material coated on the surface of the electrophoretic particle body 10, as shown in FIG. 2.

It should be explained that the electrophoretic particle may be an electrophoretic particle positively charged or an electrophoretic particle negatively charged. The electrophoretic particle body can be an electrophoretic particle that is known or to be developed in future. A photoluminescence material is a material that can have characteristics of emitting light in a dark environment after radiated by UV rays, sunlight, or common lamplight. Intensify and duration of the emitted light depend on the material properties. There are many kinds of photoluminescence materials, and long afterglow phosphor and rare-earth long afterglow fluorophor are common kinds. The long afterglow phosphor is a kind of phosphor made of zinc sulfide and copper for example and can be made at a low cost. However, a sulfide is unstable and poor at anti-aging, tends to deliquate, and has a short duration of afterglow. The rare-earth long afterglow fluorophor is a kind of long afterglow fluorophor formed by adding bivalent rare-earth europium or bivalent rare-earth dysprosium into a matrix of aluminate fluorophor, and its duration of afterglow is up to over 12 hours. The photoluminescence material can be prepared by taking use of an existing material or a material that will be developed in future, and it will not be elaborated in the embodiment of the present application.

For the electrophoretic particle according to an embodiment of the present application, the surface of the electrophoretic particle body is coated with a layer of photoluminescence material which can absorb energy in a bright environment and release the energy in a dark environment, for example, at night, the electrophoretic particle is used for electrophoretic display and can achieve display in a dark environment.

Optionally, a material for manufacturing the layer of photoluminescence material is a rear earth long afterglow photoluminescence material which has a long light duration in a dark environment.

Optionally, the photoluminescence material is a colored photoluminescence material, and the color is for example red, green, blue or the like. The photoluminescence material is colored and the electrophoretic particle comprising a layer of photoluminescence material can emit colored light. Thus, the electrophoretic particle used for electrophoretic display can achieve display of various colors. For example, the red photoluminescence material can be $Y_2O_2:Eu^{2+}$, $Ti^{4+}$, $My^{2+}$, with a light-emitting duration up to 5 hours, the green photoluminescence material can be $SrAl_2O_4:Eu^{2+}$, $Dy^{3+}$, with a light-emitting duration up to more than ten hours, and the blue photoluminescence material can be $CaAl_2O_4:Eu^{2+}$, $Dy^{3+}$, with a light-emitting duration up to over ten hours. Of course, the layer of photoluminescence material can be of another color.

Figure 3:
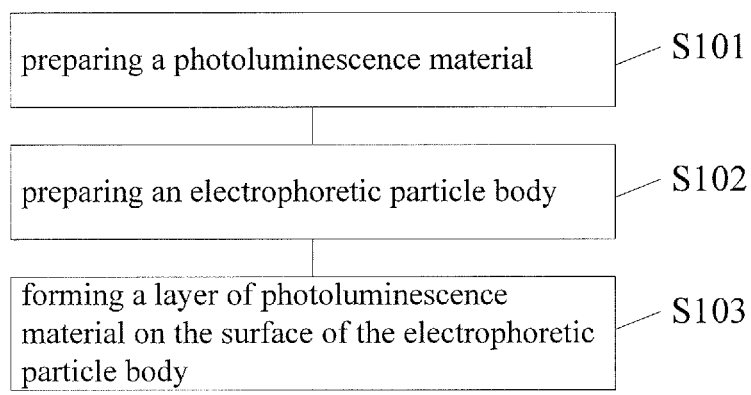
FIG. 3 is a schematic diagram of a method for preparing the electrophoretic particle according to FIG. 2, according to an embodiment of the present application.

An embodiment of the present application provides a method for preparing the electrophoretic particle mentioned above, which comprises the following steps S101 to S103, as shown in FIG. 3.

Step S101, preparing a photoluminescence material.

The photoluminescence material can be prepared by a known technology or a technology that will be developed in future, and the embodiments of the present application are not limited thereto. There are many preparing methods depending on the sorts of the luminescene materials, for example, a high temperature solid state reaction method, a combustion method, a hydrothermal synthesis method, a sol-gel method, a co-precipitation method, a microwave method and son on. The preparing methods for specific light-emitting material can be referred to the existing technologies. The disclosure takes the sol-gel method as an example.

Figure 4:
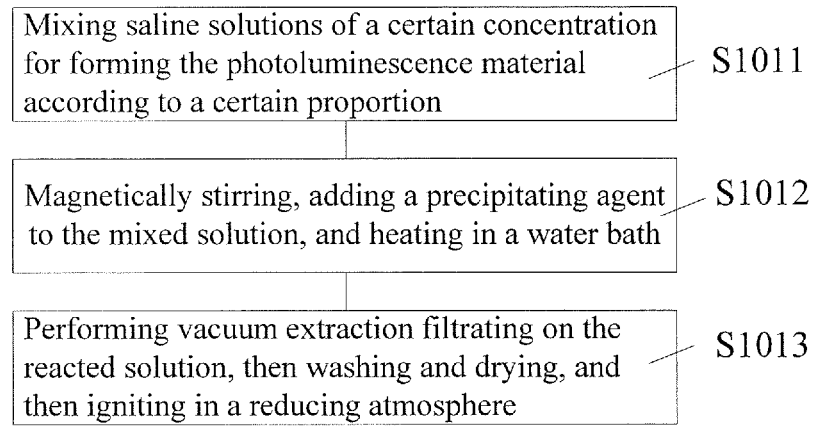
FIG. 4 is a schematic diagram of a method for preparing an photoluminescence material according to an embodiment of the present application.

As shown in FIG. 4, an example for the step S101 further comprises steps S1011 to S1013.

Step S1011, mixing saline solutions of a certain concentration for forming the photoluminescence material according to a certain proportion.

For example, the green long afterglow photoluminescence material is $SrAl_2O_4:Eu^{2+}$, $Dy^{3+}$, and the saline solutions for forming the photoluminescence material comprises $SrCl_2$, $EuCl_3$, $DyCl_3$, $AlCl_3$ and etc.

Step S1012, magnetically stirring, adding a precipitating agent to the mixed solution, and heating in a water bath.

The precipitating agent can be weak acid, weak alkali or the like that reacts with the saline solution and produces non-solvent precipitation.

Step S1013, performing vacuum extraction filtrating on the reacted solution, then washing and drying, and then igniting in a reducing atmosphere.

The reducing atmosphere can be an atmosphere filled with reduction gas, for example, an atmosphere filled with hydrogen.

Of course, the sol-gel method forming the photoluminescence material is not limited to the above-mentioned method and the steps mentioned above, which is taken as an example for purpose of illustration in the embodiment of the present application.

Step 102, preparing an electrophoretic particle body.

There are many kinds of electrophoretic particle bodies, each of which has corresponding preparing methods. The most common material for forming an electrophoretic particle body is titanium oxide, and this embodiment is described by taking a method for manufacturing such an electrophoretic particle body as an example.

Figure 5:
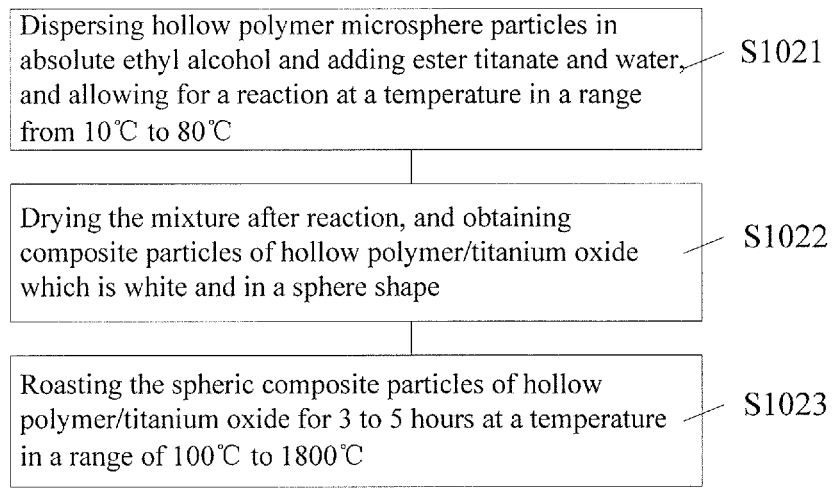
FIG. 5 is a schematic diagram of a method for preparing an electrophoretic particle body according to an embodiment of the present application.

As shown in FIG. 5, one example of the step S102 further comprises steps S1021 to S1023 as below.

Step 1021, dispersing hollow polymer microsphere particles in absolute ethyl alcohol and adding ester titanate and water, and allowing for a reaction at a temperature in a range from 10° C. to 80° C.

The hollow polymer can be benzene olefine acid ester polymer, for example, polystyrene.

Step S1022, drying the mixture after reaction, and obtaining composite particles of hollow polymer/titanium oxide which is white and in a sphere shape.

Step S1023, roasting the spheric composite particles of hollow polymer/titanium oxide for 3 to 5 hours at a temperature in a range of 100° C. to 1800° C.

It should be noted that the electrophoretic particle body can also be a polymer sphere, a polymer sphere coated by titanium oxide, and so on. Only one method for preparing electrophoretic particle body is taken as an example in this embodiment and other methods for preparing an electrophoretic particle body can be referred to existing technologies.

Step S103, forming a layer of photoluminescence material on the surface of the electrophoretic particle body.

There are many methods for forming a layer of photoluminescence on the surface of the electrophoretic particle body, such as a mechanical method, a spraying method, an emulsion condensation method, a dispersion polymerization method and so on. This embodiment of the present application is described by taking the mechanical method as an example for forming a layer of photoluminescence material on the surface of the electrophoretic particle body.

Figure 6:
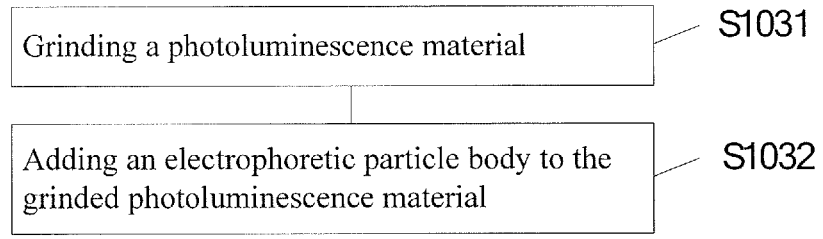
FIG. 6 is a schematic diagram of a method for forming a photoluminescence material layer on the surface of an electrophoretic particle body according to an embodiment of the present application.

As shown in FIG. 6, an example of forming a layer of photoluminescence material on the surface of the electrophoretic particle body further comprises steps S1031 to S1032 as below.

Step S1031, grinding a photoluminescence material.

For example, grinding of the photoluminescence material can be conducted by means of a grinding device.

Step S1032, adding an electrophoretic particle body to the grinded photoluminescence material.

The electrophoretic particle body is added to the grinded photoluminescence material and the grinded photoluminescence material is attached or bonded onto the surface of the electrophoretic particle body by shearing forces generated in grinding. So, a layer of photoluminescence material is formed on the electrophoretic particle body. An electrophoretic particle with a surface coated by a layer of photoluminescence material is thus obtained.

Of course, processes for forming the electrophoretic particle are not limited to the specific steps described in the embodiment of the present application. A layer of photoluminescence material can be formed on the surface of the electrophoretic particle body by means of a known method or another method or steps that will be developed in future, and the disclosure of the present application is not limited hereto. For example, forming a layer of photoluminescence material on the surface of the electrophoretic particle body can also be achieved by forming a layer of photoluminescence material on the electrophoretic particle body by means of electrostatic adsorption of the electrophoretic particle. It can also be achieved by forming a layer of photoluminescence material on the surface of the electrophoretic particle body by means of ionic bonds or covalent bonds of the material forming the electrophoretic particle.

Figure 7:
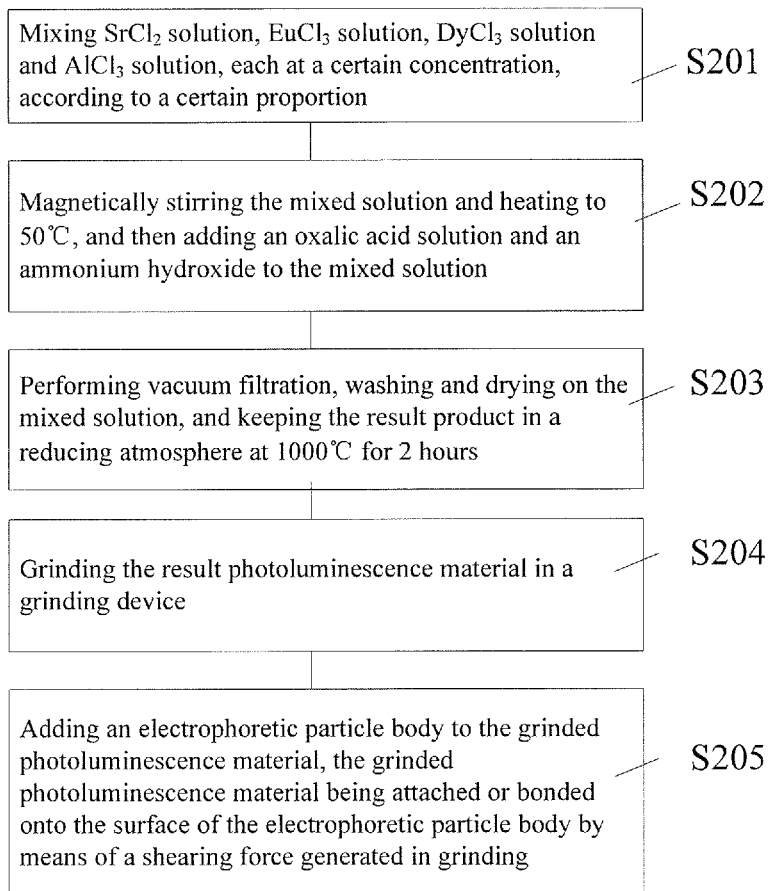
FIG. 7 is a schematic diagram of a method for wrapping a layer of green long afterglow photoluminescene material on the surface of an electrophoretic particle body according to an embodiment of the present application.

This embodiment of the present application is described in detail by taking forming a layer of green long afterglow photoluminescence material for an electrophoretic particle as an example. For example, as shown in FIG. 7, preparing electrophoretic particles coated with a layer of green long afterglow photoluminescence material comprises Steps S201 to S205.

Step S201, mixing $SrCl_2$ solution, $EuCl_3$ solution, $DyCl_3$ solution and $AlCl_3$ solution, each at a certain concentration, according to a certain proportion.

Step S202, magnetically stirring the mixed solution and heating to 50° C., and then adding an oxalic acid solution of a certain concentration and an ammonium hydroxide of a certain concentration to the mixed solution.

For example, the oxalic acid solution of a certain concentration and the ammonium hydroxide of a certain concentration are added to the mixed solution so as to maintain the pH value of the mixed solution in the range of 8 to 9.

Step S203, performing vacuum filtration, washing and drying on the mixed solution, and keeping the result product in a reducing atmosphere at 1000° C. for 2 hours.

Step S204, grinding the result photoluminescence material in a grinding device.

Step S205, adding an electrophoretic particle body to the grinded photoluminescence material, the grinded photoluminescence material being attached or bonded onto the surface of the electrophoretic particle body by means of a shearing force generated in grinding.

Of course, the method for preparing an electrophoretic particle coated with a green long afterglow photoluminescence material is not limited to the steps described above. This embodiment of the present application is described by taking the above steps as an example.

An embodiment of the present application provides an electrophoretic microstructure comprising electrophoresis liquid which comprises at least one electrophoretic particle provided by an embodiment of the present application.

It should be noted that, an electrophoresis liquid typically comprises a suspending liquid, a charge control agent, a dye and so on. The electrophoresis liquid can be applied to not only display devices but also other devices, and for example for manufacturing a grating. When the electrophoresis is used for manufacturing a grating, the electrophoresis liquid is capsulated in an electrophoretic microstructure of the grating, and electrophoretic particles aggregate at one side of the electrophoretic microstructure of the grating under the action of an electronic field applied externally and displays the color of the electrophoretic particles, and the other side opposite to the electrophoretic particles is used for transmit light. The portions where the electrophoretic particles aggregate and the portions for transmission can constitute of stripes. Furthermore, the composition of the electrophoresis liquid may vary depending on its application, and the electrophoresis liquid further comprises other substance(s) when it is applied in other field. The disclosure of the present application is not limited to the specific composition of the electrophoresis liquid and its preparing method.

The electrophoretic microstructure is the smallest single unit in the electrophoretic device that contains electrophoresis liquid. The electrophoretic microstructure can be an electrophoretic microcapsule or an electrophoretic microcup that is filled with electrophoresis liquid. As for a grating, the electrophoretic microstructure can be an outer shell containing electrophoresis liquid therein. The grating can comprise a plurality of electrophoretic microstructures. Moreover, the width of the stripes of the electrophoretic microstructures may vary according to different requirements.

Optionally, the electrophoretic microstructures may be electrophoretic microcapsules or electrophoretic microcups. It should be noted that, for electronic paper of microcapsule type or micro-cup type, its electrophoresis liquid can only comprise a kind of charged particles. The charged particles can be electrophoretic particles with positive charges, and can also by electrophoretic particles with negative charges. Or, the electrophoresis liquid can comprise electrophoretic particles with positive charges and electrophoretic particles with negative charges. Where the electrophoresis liquid comprises one kind of charged particles only, the suspending liquid and the charged particles have different colors. If one side of a substrate is applied with a voltage, electrophoretic display can be achieved due to the principle that same electric charges mutually repel and opposite electric charges mutually attract. For example, the suspending liquid is white, the electrophoresis liquid comprises black electrophoretic particles with negative charges. Where the bottom substrate is negatively charged, the black electrophoretic particles move to close to the upper substrate and the electrophoretic microstructure presents black. Of course, the electrophoretic microstructure also can be applied with a voltage at the upper substrate, and the operating principle is the same as the operation mechanism for the case where the bottom substrate is applied with a voltage.

Preferably, the electrophoresis liquid comprises electrophoretic particles with positive charges and electrophoretic particles with negative charges, and the electrophoretic particles with positive charges and the electrophoretic particles with negative charges are in different colors.

Because the electrophoresis comprises electrophoretic particles with positive charges and electrophoretic particles with negative charges, and the electrophoretic particles with positive charges and the electrophoretic particles with negative charges are in different colors, when the two substrates are applied with a voltage therebetween, the electrophoretic particles with positive charges and the electrophoretic particles with negative charges move close to the corresponding substrates, respectively, so as to implement display. Especially in a dark environment, for example at night, the electrophoretic particles can still implement display. The electrophoretic particles with positive charges and the electrophoretic particles with negative charges have different colors, the two different colors can be mixed at a mix ratio of the electrophoretic particles which is controlled by the applied voltage, and thus the mixed color of the two different colors can be controlled. In this way, color display can be achieved without a color filter and the costs are saved. For example, a layer of red photoluminescence material is coated on the surface of an electrophoretic particle with negative charges, and a layer of blue photoluminescence material is coated on an electrophoretic particle with positive charges, an electrophoretic display device comprising those electrophoretic particles can display a purple color. Various colors can be displayed if the mixing ratio of two kinds of electrophoretic particles is controlled through applied voltages, and therefore color display can be achieved.

An embodiment of the present application provides an electrophoretic display device which comprises an electrophoretic microstructure according to an embodiment of the present application.

It should be noted that, the electrophoresis liquid contained in the microstructure of the electrophoretic display device comprises two kinds of electrophoretic particles of different colors. The electrophoretic particles can display normally in daylight, the colors presented by the electrophoretic particles are the colors of the layers of photoluminescence materials, and the layers of photoluminescence materials coated on the surfaces of the electrophoretic particles can absorb energy in daylight. The layer of photoluminescence material coated on the surface of the electrophoretic particle can release energy at night, and display can be achieved at night. Furthermore, the electrophoretic particles with positive charges and the electrophoretic particles with negative charges have different colors, the two different colors can be mixed at a mix ratio of the electrophoretic particles which is controlled by the applied voltage, and thus the mixed color of the two different colors can be controlled. In this way, color display can be achieved without a color filter and the costs are saved.

The foregoing are merely exemplary embodiments of the invention, but are not used to limit the protection scope of the invention. The protection scope of the invention shall be defined by the attached claims.

The invention claimed is:

1. An electrophoretic particle comprising an electrophoretic particle body and a layer of photoluminescence material coated on a surface of the electrophoretic particle body, wherein the layer of photoluminescence material is made of a rare-earth long afterglow photoluminescence material, and the electrophoretic particle body is a spheric composite particle of hollow polymer and titanium, or a polymer sphere coated by titanium oxide.

2. The electrophoretic particle according to claim 1, wherein the photoluminescence material is a colored photoluminescence material.

3. The electrophoretic particle according to claim 1, wherein the electrophoretic particle is positively or negatively charged.

4. An electrophoretic microstructure comprising electrophoresis liquid which comprises at least one electrophoretic particle according to claim 1.

5. The electrophoretic microstructure according to claim 4, wherein the microstructure is a microcapsule or a microcup.

6. The electrophoretic microstructure according to claim 5, wherein the electrophoresis comprises an electrophoretic particle positively charged and an electrophoretic particle negatively charged, and the electrophoretic particle positively charged and the electrophoretic particle negatively charged are in different colors.

7. An electrophoretic display device comprising the electrophoretic microstructure according to claim 4.

8. A method for manufacturing an electrophoretic particle, comprising:
   preparing a photoluminescence material;
   preparing an electrophoretic particle body; and
   forming a layer of photoluminescence material on the surface of the electrophoretic particle body;
   wherein the layer of photoluminescence material is made of a rare-earth long afterglow photoluminescence material, and the electrophoretic particle body is a spheric composite particle of hollow polymer and titanium, or a polymer sphere coated by titanium oxide.

9. The method for manufacturing an electrophoretic particle according to claim 8, wherein forming a layer of photoluminescence material on the surface of the electrophoretic particle body comprises:
   grinding the photoluminescence material; and
   adding the electrophoretic particle body to the grinded photoluminescence material.

10. The electrophoretic particle according to claim 2, wherein the electrophoretic particle is positively or negatively charged.

* * * * *